United States Patent
Sah et al.

(10) Patent No.: US 8,485,943 B2
(45) Date of Patent: Jul. 16, 2013

(54) VEHICLE FLUID PRESSURE CONTROL

(75) Inventors: Jy-Jen F. Sah, West Bloomfield, MI (US); Ali K. Naqvi, White Lake, MI (US); Lisa M. Talarico, Farmington Hills, MI (US); Syed Naqi, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 13/029,403

(22) Filed: Feb. 17, 2011

(65) Prior Publication Data
US 2012/0211324 A1    Aug. 23, 2012

(51) Int. Cl.
*F16H 61/26* (2006.01)
*F16H 7/14* (2006.01)
*B60K 17/28* (2006.01)

(52) U.S. Cl.
USPC ............... 477/127; 475/118; 180/53.4

(58) Field of Classification Search
USPC .......... 477/127, 138; 475/118, 121, 122, 475/123; 180/53.4, 53.8
See application file for complete search history.

(56) References Cited

U.S. PATENT DOCUMENTS

| | | | |
|---|---|---|---|
| 6,048,288 A * | 4/2000 | Tsujii et al. | 477/5 |
| 6,896,636 B2 * | 5/2005 | Fideler | 475/116 |
| 6,962,547 B2 * | 11/2005 | Inoue et al. | 475/123 |
| 2011/0212809 A1 * | 9/2011 | Tsutsui et al. | 477/5 |
| 2012/0108387 A1 * | 5/2012 | Akebono et al. | 477/12 |

* cited by examiner

*Primary Examiner* — Roger Pang
(74) *Attorney, Agent, or Firm* — Quinn Law Group, PLLC

(57) ABSTRACT

A vehicle includes a pump configured to output fluid at a commanded pressure when driven by a motor. A first hydraulic device is operably connected to the pump and configured to operate in response to receiving fluid at a first pressure. A second hydraulic device is operably connected to the pump and configured to execute a shift command in response to receiving fluid at a second pressure. A control processor is configured to control the commanded pressure in accordance with a priority scheme. That is, the control processor is configured to direct at least a portion of the commanded pressure from the first hydraulic device to the second hydraulic device for a duration of a shift command based on the priority scheme and redirect at least a portion of the commanded pressure to the first hydraulic device upon completion of the shift action.

13 Claims, 1 Drawing Sheet

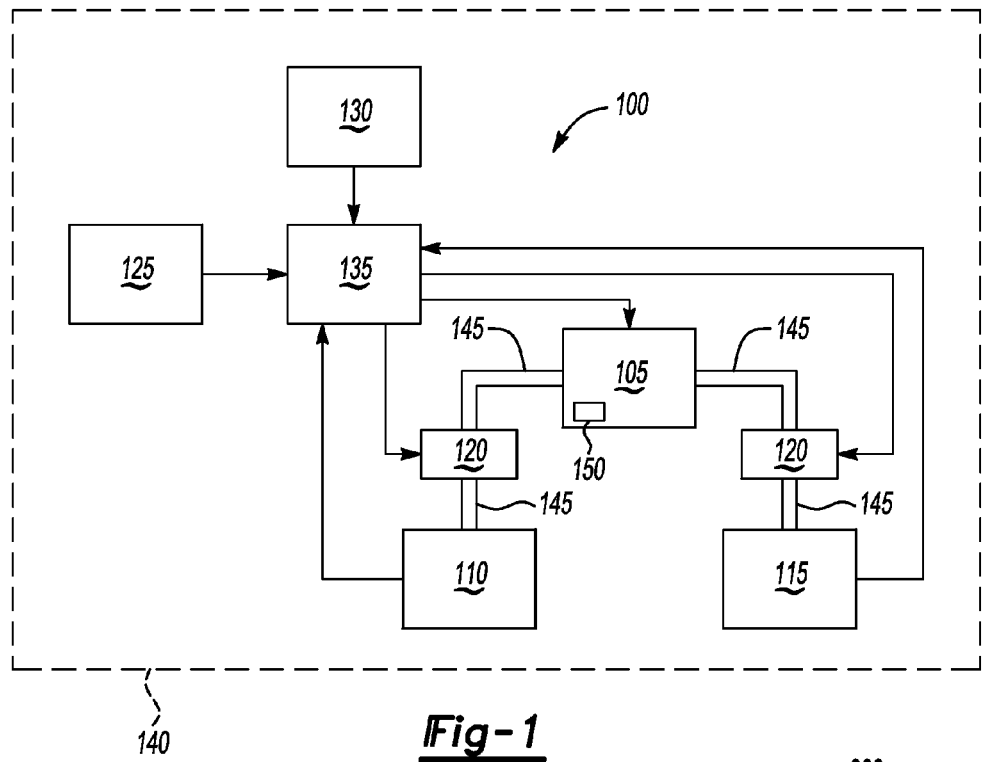
*Fig-1*
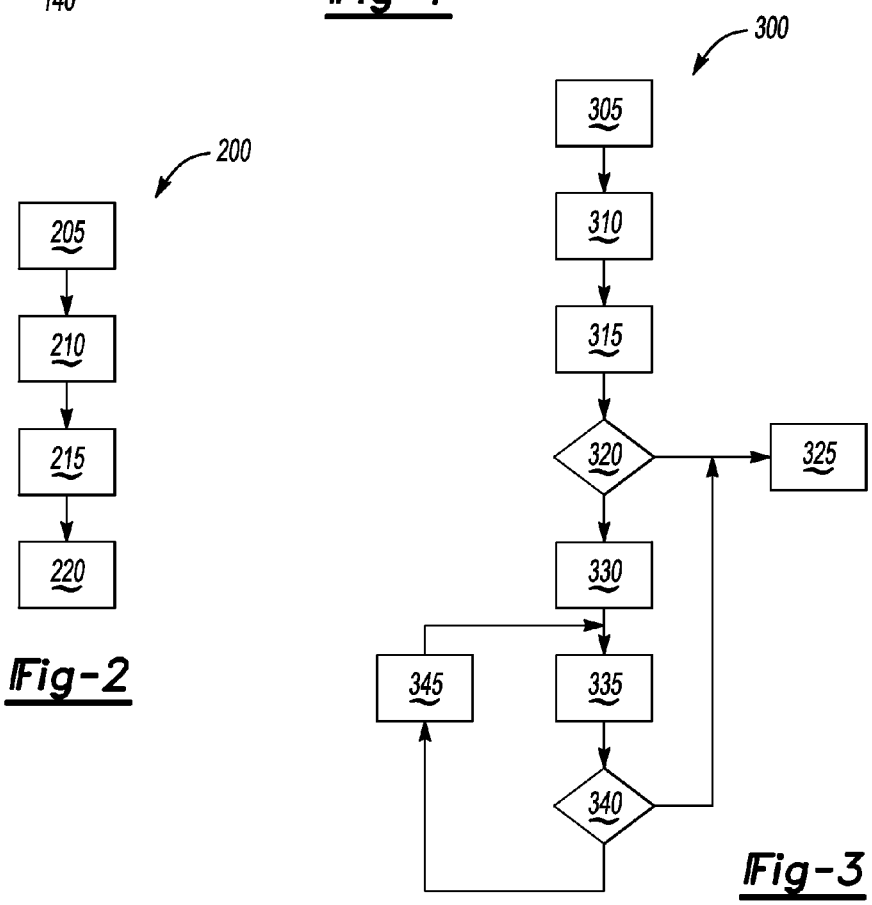
*Fig-2*
*Fig-3*

VEHICLE FLUID PRESSURE CONTROL

TECHNICAL FIELD

The invention relates to fluid pressure control in a vehicle.

BACKGROUND

Passenger and commercial vehicles include various hydraulic devices and a main pump that provides a fluid to the hydraulic devices. For instance, a lubrication system is a hydraulic device that provides lubrication to various vehicle components. Further, a clutch assembly is a hydraulic device used to engage and disengage gears within a transmission. As more hydraulic devices request fluid from the main pump, the fluid pressure output by the pump increases. The operation of the main pump is dependent upon the rotational speed of the engine, and the priority scheme (e.g., priority given to one hydraulic device over another) of the main pump is mechanically controlled.

SUMMARY

A vehicle includes a pump configured to output fluid at a commanded pressure. A motor is configured to drive the operation of the pump. A first hydraulic device is operably connected to the pump and configured to operate in response to receiving fluid at a first pressure. A second hydraulic device is operably connected to the pump and configured to execute a shift command in response to receiving fluid at a second pressure. A control processor is configured to control the commanded pressure based on a priority scheme. The control processor is configured to direct at least a portion of the commanded pressure from the first hydraulic device to the second hydraulic device for a duration of a shift command in accordance with the priority scheme. The control processor is further configured to redirect at least a portion of the commanded pressure to the first hydraulic device upon completion of the shift action.

A method of controlling a line pressure in a vehicle includes providing at least a portion of a commanded pressure to a first hydraulic device, receiving a shift command, and directing at least a portion of the commanded pressure from the hydraulic device to a friction element in response to the shift command to cause the friction element to execute a shift action. The method further includes redirecting at least a portion of the commanded pressure to the hydraulic device upon completion of the shift action.

The implementations of the systems and methods described herein can be used, for instance, in a vehicle to electronically control the priority of the hydraulic devices in the vehicle, which may result in reduced noise, reduced power consumption, increased fuel economy, and increased pump life.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic view of a system implemented in a vehicle that may be used to control fluid pressure.

FIG. 2 is a flowchart of a process that may be implemented by the system of FIG. 1 to control fluid pressure in accordance with a priority scheme.

FIG. 3 is a flowchart of another process that may be implemented by the system of FIG. 1 to control fluid pressure in accordance with the priority scheme.

DETAILED DESCRIPTION

A system and method of controlling fluid pressure in a vehicle in accordance with a priority scheme is provided. The vehicle may include a pump configured to output fluid at a commanded pressure when driven by a motor. A first hydraulic device is operably connected to the pump and configured to operate in response to receiving fluid at a first pressure. A second hydraulic device is operably connected to the pump and configured to execute a shift command in response to receiving fluid at a second pressure. A control processor is configured to direct at least a portion of the commanded pressure from the first hydraulic device to the second hydraulic device for a duration of a shift command and redirect at least a portion of the commanded pressure to the first hydraulic device upon completion of the shift action. This example approach of increasing the commanded fluid pressure in stages following, for instance, the shift command, may reduce the amount of noise generated by the pump, especially when the vehicle is operated at low speeds, reduce power consumption of a motor driving the pump, increase fuel efficiency of the vehicle, and increase the life of the pump. Further, using the motor to drive the pump provides the controller with more control over the operation of the pump since the operation of the pump is not dependent upon engine speed.

FIG. 1 illustrates a system 100 that is able to control a fluid pressure provided by a pump. The system 100 may take many different forms and include multiple and/or alternate components and facilities. While a system 100 is shown in the Figures, the components illustrated in the Figures are not intended to be limiting. Indeed, additional or alternative components and/or implementations may be used.

In one example approach, the system 100 includes a pump 105, a first hydraulic device 110, a second hydraulic device 115, a plurality of valves 120, a speed sensor 125, a shift sensor 130, and a control processor 135. The system 100 may be implemented in a vehicle 140, which may include a passenger or commercial automobile. Further, the system 100 may be implemented in a hybrid electric vehicle including a plug-in hybrid electric vehicle (PHEV) or an extended range electric vehicle (EREV), a gas-powered vehicle, a battery electric vehicle (BEV), or the like.

The pump 105 may include any device configured to provide a fluid at a commanded pressure. For instance, the pump 105 may receive a pressure command signal that commands the pump 105 to output fluid to a specific pressure using, for example, a motor 150. The motor 150 may include any electronic device configured to convert electrical energy from a power source (not shown) such as a battery into rotational motion. Although illustrated as part of the pump 105, the motor 150 may alternatively be a separate device configured to receive the commanded pressure. In some possible implementations, the motor 150 may drive operation of the pump 105. The commanded pressure may be based on the number of hydraulic devices requesting a fluid pressure from the pump 105 and the particular pressures needed by those hydraulic devices to operate. Further, the commanded pressure may be independent of the speed of the vehicle's engine (not shown). In one particular approach, the pump 105 may receive the fluid from a fluid reservoir (not shown). The pump 105 may provide fluid pressure to any number of hydraulic devices. Additionally, the system 100 may include any number of pumps 105.

The first hydraulic device 110 may be operably connected to the pump 105 via, for instance, fluid lines 145. In one particular approach, the first hydraulic device 110 may be configured to receive fluid from the pump 105. The first hydraulic device 110 may be configured to operate properly when provided with the fluid at a first fluid pressure. In one example, the first hydraulic device 110 may include a lubrication system that is configured to provide a lubricating fluid to one or more vehicle 140 components. The first hydraulic device 110 may include other hydraulic devices in addition to or as an alternative to the lubrication system.

The second hydraulic device 115 may also be operably connected to the pump 105 via the fluid lines 145. For example, the second hydraulic device 115 may be configured to receive fluid from the pump 105, and operate properly when provided with the fluid at a second fluid pressure. When used in a vehicle 140, the second hydraulic device 115 may include a clutch assembly, for example. That is, when provided with fluid at the second fluid pressure, plates of the clutch assembly may engage or disengage. When engaged, the plates of the clutch may rotate at the same speed. When disengaged, the plates of the clutch may be free to rotate at different speeds. In addition, one or more plates of the clutch may be driven by one or more torque actuators (e.g., motors) (not shown). Accordingly, the clutch assembly may be used with a transmission (not shown) to change the engagement of gears in the vehicle 140.

The valves 120 may be operably disposed between the first and second hydraulic devices 110, 115 and the pump 105 to allow fluid to flow from the pump 105 to the first hydraulic device 110, the second hydraulic device 115, or both. Accordingly, each valve 120 may include any device configured to regulate fluid flow between the pump 105 and the first and second hydraulic devices 110, 115. In one particular approach, the valve 120 may include a pressure control solenoid that, in response to a valve control signal, opens and closes. When open, the valve 120 may allow fluid to flow from the pump 105 to the first or second hydraulic device 115. When closed, the valve 120 may be configured to prevent fluid from flowing from the pump 105 to the first or second hydraulic device 115. The system 100 may include any number of valves 120.

The speed sensor 125 may include any device configured to measure a speed of, for instance, the vehicle 140, and output a speed signal representative of the measured speed. In one particular approach, the speed sensor 125 may be configured to measure a rotational speed of a wheel (not shown) or axle (not shown) of the vehicle 140. As such, the speed sensor 125 may include an encoder or resolver. The system 100 may include any number of speed sensors 125. For instance, the system 100 may include one speed sensor 125 for each wheel in the vehicle 140. That is, in a passenger vehicle 140, the system 100 may include four speed sensors 125.

The shift sensor 130 may include any device configured to measure a position of a transmission (not shown) of the vehicle 140 and output a shift position signal representative of the measured position. In one particular approach, a driver of the vehicle 140 may use a shift lever (not shown) to select gears. Therefore, the shift sensor 130 may be operably disposed in the vehicle 140 in a way that allows the shift sensor 130 to identify the intended position of the transmission as selected by the driver. Alternatively, the shift sensor 130 may be disposed within the transmission and identify the position of the transmission based on the engagement and/or disengagement of the gears within the transmission. The system 100 may include any number of shift sensors 130.

The control processor 135 may include any device configured to control the operation of the pump 105 and/or valves 120 based on, for example, the signals received from the speed sensor 125 and the shift sensor 130. For instance, the control processor 135 may be configured to output the pressure command signal to the pump 105 or the motor 150. In turn, the motor 150 may cause the pump 105 to provide fluid at the commanded pressure. This way, the control processor 135 may be configured to control the commanded pressure and the priority given to each of the hydraulic devices 110, 115 with or without an additional mechanical priority scheme. As discussed in greater detail below, the control processor 135 may be configured to change the commanded pressure in stages based on various conditions of the vehicle 140, including a shift position and speed of the vehicle 140. Doing so may, for instance, reduce noise generated by the pump 105, reduce power consumption of the motor 150, increase the fuel economy of the vehicle 140, and increase the life of the pump 105. The control processor 135 may also be configured to control the fluid flow to the first and second hydraulic devices 110, 115 by controlling the operation of the valves 120. The control processor 135 may be configured to generate one or more valve control signals that may cause one or both of the valves 120 to open or close.

The control processor 135 may be configured to command different fluid pressures from the pump 105 based on the fluid pressures needed to operate the first and second hydraulic devices 110, 115 in accordance with a priority scheme. Indeed, the control processor 135 may be configured to command the pump 105 to provide the first fluid pressure, the second fluid pressure, or any other fluid pressure within the operating parameters of the pump 105. The fluid pressure commanded by the control processor 135 may depend on requests from various vehicle components such as a transmission control module (not shown), an engine control module (not shown), etc. For example, the transmission control module may request that fluid pressure be provided to a clutch assembly to change the engagement of gears within the transmission. The control processor 135 may be configured to execute this and other requests for fluid pressure and command the pump 105 to generate a fluid pressure that can accommodate these requests.

In one approach, the control processor 135 may be configured to command pressure from the pump 105 in stages so, e.g., hydraulic devices with a higher priority are provided with fluid pressure before hydraulic devices with a lower priority. For instance, the control processor 135 may recognize that the second hydraulic device 115 has a higher priority than the first hydraulic device 110. Thus, when the control processor 135 receives a request that requires the pump 105 to provide fluid at a higher pressure to operate both the first and second hydraulic devices 110, 115, instead of executing the new request in addition to any previous requests, the control processor 135 may be configured to initially execute the request with respect to the second hydraulic device 115 while ignoring the request to provide fluid pressure to the first hydraulic device 110. After the request to provide fluid pressure to the second hydraulic device 115 is complete, the control processor 135 may be configured to command enough pressure to execute the request to provide fluid to the first hydraulic device 110.

By way of example, the control processor 135 may command a pressure sufficient to enable a lubrication system (e.g., the first hydraulic device 110) based on a previous request. In other words, the commanded pressure may be greater than or substantially equal to the first fluid pressure. If the control processor 135 receives a shift command signal, the control processor 135 may command the fluid pressure to increase to a level to fulfill the shift action and ignore the previous request to enable the lubrication system. For instance, the shift action may require a clutch assembly (e.g., the second hydraulic device 115) to be enabled, which may require a higher commanded pressure than the lubrication system. During the shift action, the clutch assembly may have a higher priority than the lubrication system. Accordingly, to fulfill the shift action, the control processor 135 may command the pressure output by the pump 105 to increase by a difference between the second fluid pressure and the first fluid pressure. Once the shift action is complete, the control processor 135 may command that the pressure increase again (e.g., to a pressure that is greater than or substantially equal to a combination of the first fluid pressure and the second fluid pressure) to fulfill the previous request to enable the lubrication system.

One way to increase the commanded pressure in stages is to direct the commanded pressure from the first hydraulic device 110 to the second hydraulic device 115 for a predetermined time period or until an action, such as a shift action, is complete. This way, the commanded pressure does not need to accommodate both the first and second hydraulic devices 110, 115 for the predetermined time period or for the duration of the action. The control processor 135 may further increase the commanded pressure upon completion of the action and redirect at least a portion of the commanded pressure to the first hydraulic device 110. As discussed above, the control processor 135 may control the commanded pressure via the pressure command signal.

In general, computing systems and/or devices, such as the control processor 135, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

FIG. 2 illustrates a flowchart of a process 200 that may be implemented by the system 100 to, for example, have greater control over the priority of various hydraulic devices 110, 115 in the vehicle 140.

At block 205, the system 100 may provide a portion of a commanded pressure to the first hydraulic device 110. For instance, the control processor 135 may generate the pressure command signal based on requests for fluid pressure from various system 100 components. The control processor 135 may transmit the pressure command signal to the pump 105 or the motor 150 of the pump 105, which in turn provides the first hydraulic device 110 with at least a portion of the commanded pressure. The commanded pressure at block 205, therefore, may be equal to or greater than the first fluid pressure.

At block 210, the system 100 may receive a shift command. For instance, the control processor 135 may receive a shift command signal from a shift sensor 130. The shift command signal may represent the driver's gear selection for the transmission. The control processor 135 may change the commanded pressure based on the shift command. For instance, the control processor 135 may recognize that changing the gear engagement in the transmission as requested by the driver may require a fluid flow from the pump 105 to a second hydraulic device 115, such as friction element in a clutch assembly.

At block 215, the system 100 may direct at least a portion of the commanded pressure from the first hydraulic device 110 to the second hydraulic device 115 in response to the shift command. In one particular approach, the control processor 135 may recognize that, during a shift action, the second hydraulic device 115 has priority over the first hydraulic device 110 and increase the commanded pressure to a pressure that can accommodate the second hydraulic device 115. Accordingly, the control processor 135 may only need to increase the commanded pressure by a difference between the second fluid pressure and the first fluid pressure. This way, the commanded pressure may be above or substantially equal to the second fluid pressure. The control processor 135 may further close the valve 120 associated with the first hydraulic device 110 and open the valve 120 associated with the second hydraulic device 115. Thus, the second hydraulic device 115 may receive the commanded pressure, which is sufficient to operate the second hydraulic device 115.

At block 220, the system 100 may redirect at least a portion of the commanded pressure to the first hydraulic device 110 upon completion of the shift action. For example, the control processor 135 may increase the commanded pressure to a pressure that can accommodate both the first hydraulic device 110 and the second hydraulic device 115. That is, the control processor 135 may command that the commanded pressure increase by a difference between the sum of the first and second fluid pressures and the pressure commanded at block 215. Further, the control processor 135 may open the valves 120 associated with both the first and second hydraulic devices 110, 115, which may provide fluid at the first fluid pressure to the first hydraulic device 110 and fluid at the second fluid pressure to the second hydraulic device 115. The control processor 135 may keep both valves 120 open at least until the completion of the shift action.

FIG. 3 illustrates another process 300 that may be implemented by the system 100. In particular, the process 300 of FIG. 3 may be implemented by the control processor 135 to change the commanded pressure in stages when, e.g., the vehicle 140 is travelling at low speeds.

At block 305, the system 100 may provide a first fluid pressure to the first hydraulic device 110. For instance, the control processor 135 may command the pump 105 to provide the first fluid pressure to the first hydraulic device 110 via the fluid control signal. Moreover, the control processor 135 may command the valve 120 associated with the first fluid device to be in an open state to allow fluid to flow from the pump 105 to the first hydraulic device 110.

At block 310, the system 100 may receive a shift command. For instance, the shift sensor 130 may determine that the driver has shifted a gear shifter into a different position and output a shift command signal to the control processor 135 indicating the requested gear position from the driver. In other words, the shift command signal may represent the deriver's gear selection.

At block 315, the system 100 may measure a speed of, for instance, the vehicle 140. In one particular approach, the speed sensors 125 may measure the speed of the vehicle 140 and output the speed signal representing the measured speed to the control processor 135.

At decision block 320, the system 100 may compare the measured speed to a predetermined level. For instance, the control processor 135 may compare the speed measured at block 315 to a predetermined level. If the measured speed is above the predetermined level, the process 300 may continue at block 325. If the measured speed is at or below the predetermined level, the process 300 may continue at block 330.

At block 325, the system 100 may command the pressure generated by the pump 105 to be sufficient to enable both the first and second hydraulic devices 110, 115. That is, the control processor 135 may generate a fluid control signal that executes the requests to operate both the first and second hydraulic devices 110, 115. For instance, block 325 may be executed when the vehicle 140 is above the predetermined level discussed above. Block 325 may also be executed after block 340, described in detail below.

At block 330, the system 100 may reduce the first fluid pressure to the first hydraulic device 110 based on the priority given to the second hydraulic device 115 over the first hydraulic device 110. To reduce the pressure, the control processor 135 may generate a valve control signal that closes the valve 120 associated with the first hydraulic device 110.

At block 335, the system 100 may provide the second fluid pressure to the second hydraulic device 115 to execute the shift action commanded at block 310. As mentioned above, the second hydraulic device 115 may have a higher priority than the first hydraulic device 110 during the shift action. To increase the fluid pressure to the second hydraulic device 115, the control processor 135 may command the pump 105 to generate a pressure that is sufficient to operate the second hydraulic device 115. In one particular approach, the commanded pressure is at least the second fluid pressure. Additionally, the control processor 135 may generate a valve control signal that opens the valve 120 associated with the second hydraulic device 115.

At block 340, the system 100 may determine whether the shift action commanded at block 310 is complete. In one example, the control processor 135 may determine whether the second hydraulic device 115 has finished executing the shift action. For instance, if the second hydraulic device 115 includes a clutch assembly and the shift action commanded the plates of the clutch assembly to engage, the control processor 135 may determine whether the plates have engaged. If so, the control processor 135 may determine that the shift action is complete, and the process 300 may continue at block 325. If the plates have not engaged, the control processor 135 may determine that the shift action is not complete, and the process 300 may continue at block 345.

At block 345, the system 100 may continue to ignore and/or queue new and previous requests for fluid pressure from the pump 105 until the completion of the shift action. In the meantime, the control processor 135 may continue to command the fluid pressure to operate the second hydraulic device 115 as indicated at block 335.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a pump configured to output fluid at a commanded pressure;
a motor configured to drive the operation of the pump;
a first hydraulic device operably connected to the pump and configured to operate in response to receiving fluid at a first pressure;
a second hydraulic device operably connected to the pump and configured to execute a shift command in response to receiving fluid at a second pressure; and
a control processor configured to control the commanded pressure based on a priority scheme;
wherein the control processor is configured to direct at least a portion of the commanded pressure from the first hydraulic device to the second hydraulic device for a duration of a shift command in accordance with the priority scheme, and wherein the control processor is further configured to redirect at least a portion of the commanded pressure to the first hydraulic device upon completion of the shift action.

2. A vehicle as set forth in claim 1, wherein the control processor is configured to receive a shift command, and wherein the control processor is configured to increase the commanded pressure in response to receiving the shift command.

3. A vehicle as set forth in claim 2, wherein the control processor is configured to increase the commanded pressure by a difference between the first pressure and the second pressure in response to receiving the shift command.

4. A vehicle as set forth in claim 1, further comprising a first valve operably disposed between the pump and the first hydraulic device, wherein the first valve allows fluid to flow from the pump to the first hydraulic device when open and prevents fluid flow from the pump to the first hydraulic device when closed.

5. A vehicle as set forth in claim 4, further comprising a second valve operably disposed between the pump and the second hydraulic device, wherein the second valve allows fluid to flow from the pump to the second hydraulic device when open and prevents fluid flow from the pump to the second hydraulic device when closed.

6. A vehicle as set forth in claim 5, wherein the control processor is configured to control the operation of the first valve and the second valve.

7. A vehicle as set forth in claim 1, further comprising a speed sensor configured to measure a vehicle speed.

8. A vehicle as set forth in claim 7, wherein the control processor is configured to compare the measured vehicle speed to a predetermined value.

9. A vehicle as set forth in claim 8, wherein the control processor is configured to direct at least a portion of the commanded pressure from the first hydraulic device to the second hydraulic device for a duration of a shift command and redirect at least a portion of the commanded pressure to the first hydraulic device upon completion of the shift action if the measured speed is below the predetermined value.

10. A vehicle as set forth in claim 1, further comprising a shift sensor configured to generate the shift command.

11. A vehicle as set forth in claim 1, wherein the first hydraulic device include a lubrication system.

12. A vehicle as set forth in claim 1, wherein the second hydraulic device includes a fixation element.

13. A vehicle as set forth in claim 12, wherein the fixation element includes a clutch assembly.

* * * * *